US006954197B2

United States Patent
Morrison et al.

(10) Patent No.: US 6,954,197 B2
(45) Date of Patent: *Oct. 11, 2005

(54) SIZE/SCALE AND ORIENTATION DETERMINATION OF A POINTER IN A CAMERA-BASED TOUCH SYSTEM

(75) Inventors: Gerald Morrison, Calgary (CA); Trevor Akitt, Calgary (CA); Scott Su, Calgary (CA)

(73) Assignee: Smart Technologies Inc. (CA)

( * ) Notice: Subject to any disclaimer, the term of this patent is extended or adjusted under 35 U.S.C. 154(b) by 278 days.

This patent is subject to a terminal disclaimer.

(21) Appl. No.: 10/294,917

(22) Filed: Nov. 15, 2002

(65) Prior Publication Data

US 2004/0095318 A1 May 20, 2004

(51) Int. Cl.[7] .................................................. G09G 5/08
(52) U.S. Cl. ...................................... 345/158; 345/157
(58) Field of Search ................................ 345/156–158, 345/168–175, 180–183, 39; 178/18.01–18.04

(56) References Cited

U.S. PATENT DOCUMENTS

| | | | | |
|---|---|---|---|---|
| 4,507,557 A | | 3/1985 | Tsikos ........................ 250/341 |
| 4,742,221 A | | 5/1988 | Sasaki et al. ............... 250/221 |
| 4,746,770 A | | 5/1988 | McAvinney ................. 178/18 |
| 4,818,826 A | | 4/1989 | Kimura ........................ 178/19 |
| 5,317,140 A | | 5/1994 | Dunthorn .................... 250/211 |
| 5,502,568 A | | 3/1996 | Ogawa et al. .............. 356/375 |
| 5,936,615 A | | 8/1999 | Waters ........................ 345/173 |
| 5,982,352 A | * | 11/1999 | Pryor ........................ 345/156 |
| 6,008,798 A | | 12/1999 | Mato, Jr. et al. ........... 345/168 |
| 6,100,538 A | | 8/2000 | Ogawa .................. 250/559.38 |
| 6,208,330 B1 | | 3/2001 | Hasegawa et al. .......... 345/173 |
| 6,335,724 B1 | | 1/2002 | Takekawa et al. .......... 345/173 |
| 6,414,671 B1 | | 7/2002 | Gillespie et al. ............ 345/157 |
| 6,531,999 B1 | | 3/2003 | Trajkovic ................... 345/157 |
| 6,563,491 B1 | | 5/2003 | Omura ........................ 345/173 |
| 6,710,770 B2 | * | 3/2004 | Tomasi et al. .............. 345/168 |
| 6,803,906 B1 | * | 10/2004 | Morrison et al. ........... 345/173 |
| 2001/0019325 A1 | | 9/2001 | Takekawa .................... 345/157 |
| 2001/0022579 A1 | | 9/2001 | Hirabayashi ................ 345/175 |
| 2001/0026268 A1 | | 10/2001 | Ito ............................. 345/175 |
| 2003/0001825 A1 | * | 1/2003 | Omura et al. ............... 345/173 |

FOREIGN PATENT DOCUMENTS

| | | | |
|---|---|---|---|
| DE | 198 10 452 | 12/1998 | ........... G06F/3/033 |
| JP | 57-211637 | 12/1982 | ............. G06F/3/03 |
| JP | 8-240407 | 9/1996 | ........... G01B/11/00 |
| JP | 9-091094 | 4/1997 | ........... G06F/3/033 |
| JP | 9-319501 | 12/1997 | ............. G06F/3/03 |
| WO | WO 99/40562 | 8/1999 | ............ C09G/5/00 |

OTHER PUBLICATIONS

"CCDs in optical touch panels deliver high resolution", Bud K. Funk, Electronic Design, Sep. 27, 1980, pp. 139–143.

* cited by examiner

Primary Examiner—Vijay Shankar
Assistant Examiner—Prabodh Dharia
(74) Attorney, Agent, or Firm—Katten Muchin Rosenman LLP

(57) ABSTRACT

A touch system includes a touch surface and at least two cameras associated with the touch surface. The at least two cameras acquire images of the touch surface from different locations and having overlapping fields of view. A digital signal processor is associated with each camera. The digital signal processors process pixel data acquired by selected pixel subsets of the at least two digital cameras to generate pointer characteristic data when a pointer exists in the acquired images. The pointer characteristic data identifies edges of the pointer. A master digital signal processor triangulates the edge information in the pointer characteristic data to determine a bounding area that represents a pointer perimeter.

68 Claims, 6 Drawing Sheets

SIZE/SCALE AND ORIENTATION DETERMINATION OF A POINTER IN A CAMERA-BASED TOUCH SYSTEM

FIELD OF THE INVENTION

The present invention relates generally to camera-based touch systems and in particular to a method of determining the size/scale and orientation of a pointer in a camera-based touch system and to a camera-based touch system employing pointer size/scale and orientation determination.

BACKGROUND OF THE INVENTION

Camera-based touch systems that use optical recording devices such as cameras to acquire images of a touch surface and process the image data to determine the position of a pointer relative to the touch surface are known. For example, International PCT Application No. WO 02/03316 to Smart Technologies Inc. et al discloses a camera-based touch system including a touch surface and a plurality of cameras associated with the touch surface. The cameras have overlapping fields of view encompassing the touch surface. The cameras acquire images of the touch surface from different locations and generate image data. Processing circuitry receives and processes the image data generated by the cameras to determine the location of a pointer captured in the images relative to the touch surface using triangulation.

In particular, a processor associated with each camera receives the image data generated by the camera and processes the image data to detect the existence of the pointer in the image. Pointer information packets (PIPs) are generated by the camera processors when the pointer exists in the captured images. The PIPs, among other things, identify the pointer and either its tip or its median line. The tip or median line data in the PIPs is then processed by a master controller to determine the position of the pointer relative to the touch surface using triangulation.

Although the above-identified camera-based touch system provides significant advantages over other types of prior art passive touch systems such as analog resistive, surface acoustic wave and capacitive touch systems, improvements are always desired. Since the above-described camera-based touch system uses single point triangulation to determine the position of the pointer relative to the touch surface, resolution is limited. In addition, the camera-based touch system does not readily provide for resolution of pointer ambiguity. Accordingly, there is a need for an improved camera-based touch system.

It is therefore an object of the present invention to provide a novel method of determining the size/scale and orientation of a pointer in a camera-based touch system and to a camera-based touch system employing pointer size/scale and orientation determination.

SUMMARY OF THE INVENTION

According to one aspect of the present invention there is provided a touch system comprising:

at least two optical devices associated with a touch surface, said at least two optical recording devices acquiring images of said touch surface from different locations and having overlapping fields of view; and processing circuitry processing image data acquired by said at least two optical recording devices to detect edges of a pointer in said images and to triangulate the detected edges to determine a bounding area that defines a pointer perimeter.

Preferably, the processing circuitry further determines the center of the bounding area thereby to determine the center of the pointer. It is also preferred that the processing circuitry examines the shape of the bounding area to determine the orientation of the pointer relative to the touch surface.

In one embodiment, the touch surface is generally rectangular and an optical recording device is positioned adjacent each corner of the touch surface. The processing circuitry triangulates detected edges in images captured by multiple pairs of optical recording devices to yield multiple bounding areas. The smallest bounding area is selected as the bounding area defining the pointer perimeter. The processing circuitry averages the centers of the multiple bounding areas to determine the center of the pointer.

In a preferred form, the optical recording devices are CMOS digital cameras having selectable pixels arrays. Pixel data from subsets of the pixel arrays is processed by the processing circuitry. The processing circuitry includes a camera processor associated with each digital camera to process pixel data and detect edges of the pointer. A master processor triangulates the detected edges to yield the multiple bounding areas and selects the smallest bounding area as the bounding area representing the pointer perimeter.

Preferably pixel data at least from pixel rows capturing the region of the pointer in contact with the touch surface is processed to determine the bounding area. It is further preferred that pixel data from pixel rows capturing regions of the pointer along its length are processed to yield a series of bounding areas, the bounding areas being stacked to generate a volumetric representation of the pointer.

In another embodiment, the processing circuitry superimposes a model over the bounding area with the model defining the pointer perimeter. The processing circuitry examines parameters of the model thereby to determine the center or tip location of the pointer. The model may take the form of a rectangular box centered over the bounding area.

According to another aspect of the present invention there is provided a touch system comprising:

at least two digital cameras associated with a touch surface, said at least two digital cameras acquiring images of said touch surface from different locations and having overlapping fields of view; and processing circuitry processing pixel data acquired by said at least two digital cameras to detect edges of a pointer in said images and to triangulate the detected edges to determine at least one bounding area that represents a pointer perimeter.

According to yet another aspect of the present invention there is provided a touch system comprising:

a touch surface;

at least two cameras associated with said touch surface, said at least two cameras acquiring images of said touch surface from different locations and having overlapping fields of view;

a digital signal processor associated with each camera, the digital signal processors associated with said at least two cameras processing pixel data acquired by selected pixel subsets of the at least two digital cameras to generate pointer characteristic data when a pointer exists in said acquired images, said pointer characteristic data identifying edges of said pointer; and a master digital signal processor triangulating the edge information in said pointer characteristic data to determine a bounding area defining a pointer perimeter.

According to still yet another aspect of the present invention there is provided a method of detecting the perimeter of a pointer relative to a touch surface comprising the steps of:

acquiring multiple images of a pointer relative to said touch surface;

processing pixel data resulting from said images to detect edges of said pointer; and triangulating the detected edges to determine a bounding area representing said perimeter.

According to still yet another aspect of the present invention there is provided a method of erasing electronic ink presented on a touch surface in response to movement of a pointer over said touch surface, said method comprising the steps of:

tracking movement of said pointer over said touch surface;

determining the perimeter of the pointer that is in contact with said touch surface; and erasing electronic ink contacted by said determined perimeter.

Since two or more cameras acquire an image of the pointer when the pointer is adjacent the touch surface, the edge co-ordinates of the pointer generated by each camera define a bounding area that represents the pointer perimeter. The size and the orientation of the bounding area allows the size and orientation of the pointer to be determined. In addition, parameters of the bounding area can be used to determine the center or tip location of the pointer. Using this bounding area data to locate the pointer tip provides increased pointer position determination accuracy than is achievable using single point triangulation. This is due to the fact that by selecting the minimum bounding area, noise in the captured images that can create jitter, is reduced.

The present invention provides further advantages in that when more than two cameras are used, if one of the triangulation camera pairs yields a poor bounding area result, the other triangulation camera pairs are automatically used to determine the bounding area.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
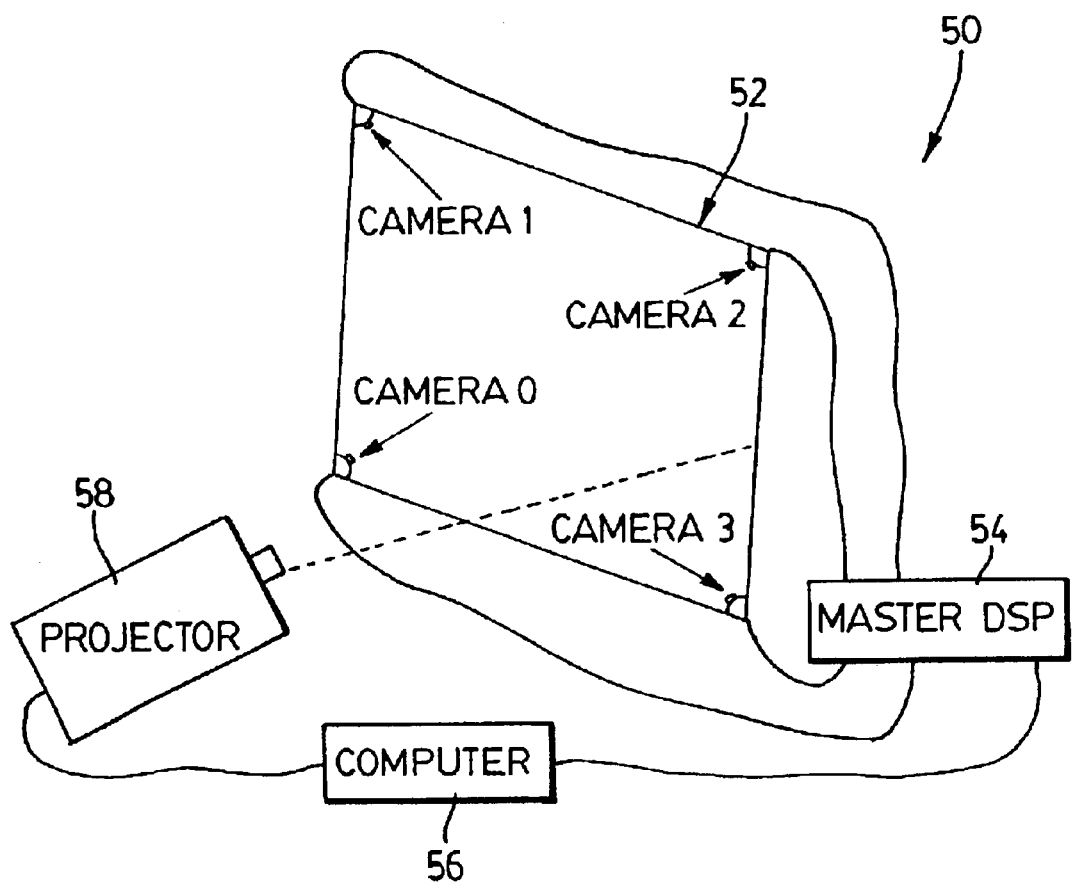
FIG. 1 is a schematic diagram of a camera-based touch system in accordance with the present invention.

Turning now to FIG. 1, a camera-based touch system such as that described in International PCT No. WO 02/03316 filed on Jul. 5, 2001, assigned to the assignee of the present invention, the contents of which are incorporated herein by reference, is shown and is generally identified by reference numeral 50. As can be seen, touch system 50 includes a touch screen 52 coupled to a digital signal processor (DSP) based master controller 54. Master controller 54 is also coupled to a computer 56. Computer 56 executes one or more application programs and provides display output that is presented on the touch screen 52 via a projector 58. The touch screen 52, master controller 54, computer 56 and projector 58 form a closed-loop so that user contacts with the touch screen 52 can be recorded as writing, drawing or erasing or can be used to control execution of application programs executed by the computer 56. In the case of writing or drawing, electronic ink corresponding to pointer movement over the touch screen is presented. In the case of erasing, presented electronic ink contacted by the pointer is removed.

Figure 2:
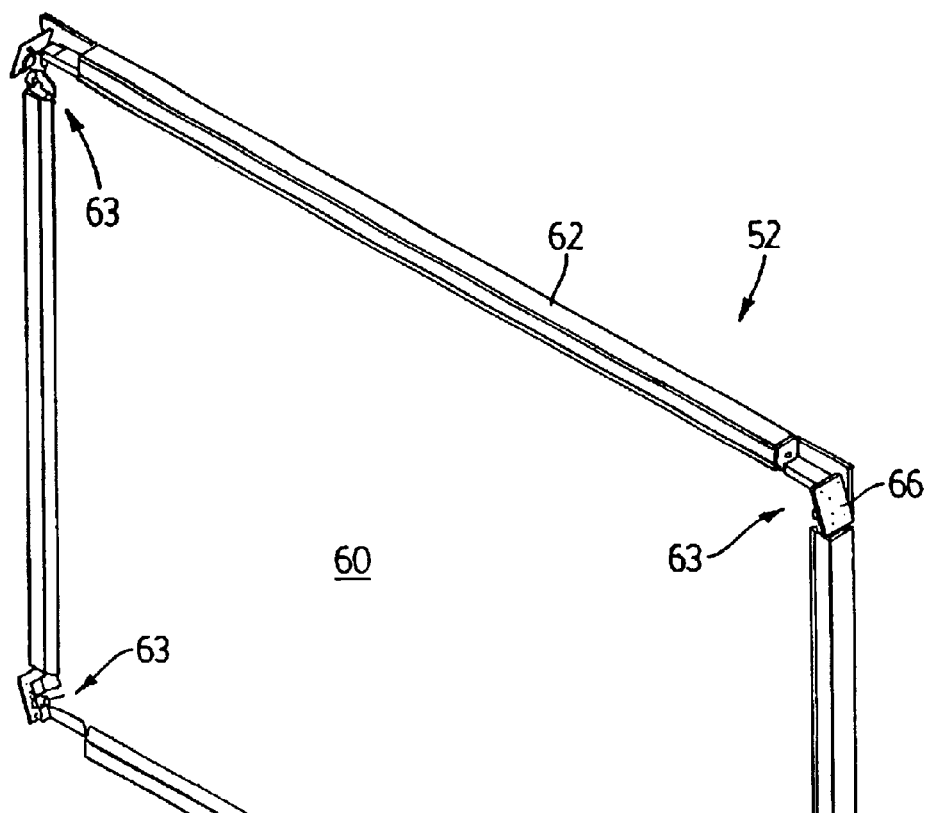
FIG. 2 is an isometric view of a touch screen forming part of the touch system of FIG. 1.
Figure 3:
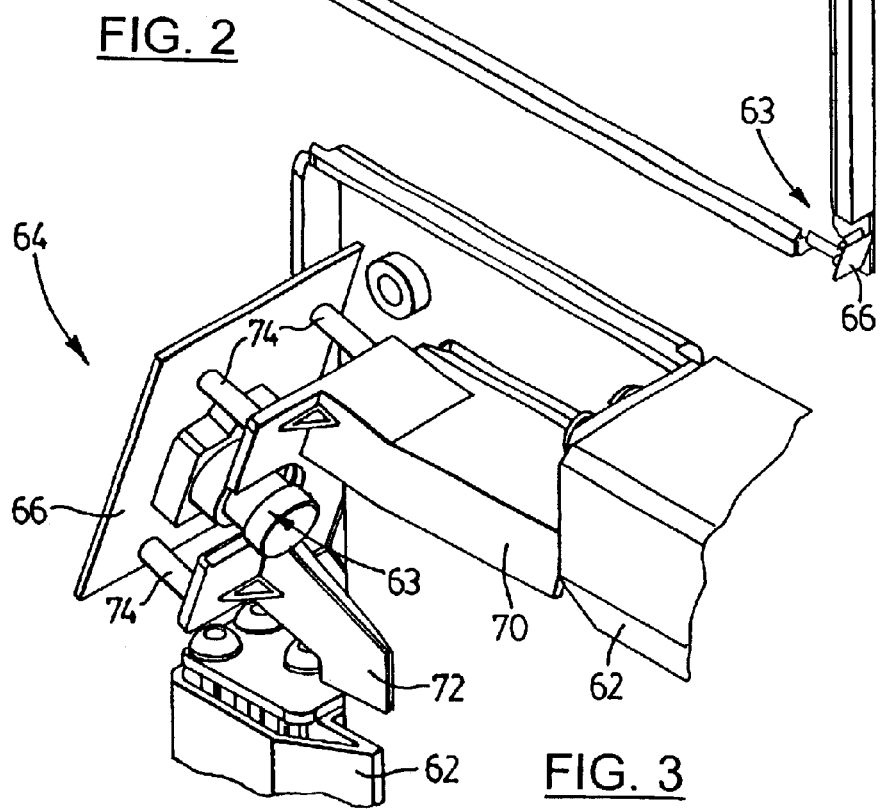
FIG. 3 is an isometric view of a corner portion of the touch screen of FIG. 2.
Figure 4:
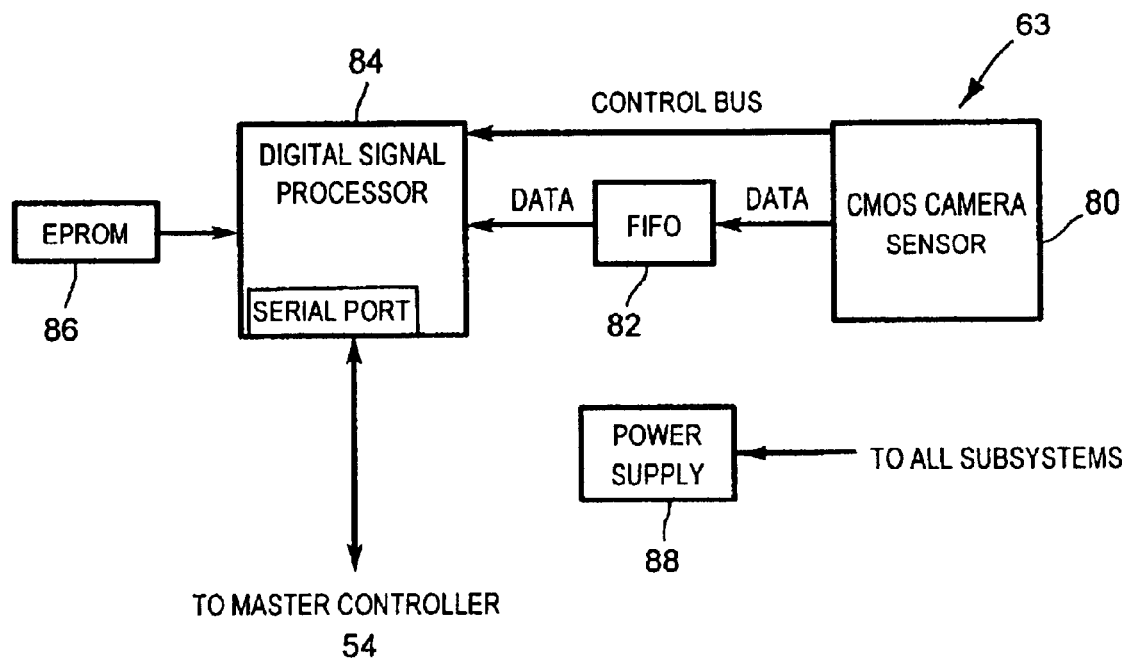
FIG. 4 is a schematic diagram of a digital camera forming part of the touch screen of FIG. 2.

FIGS. 2 to 4 better illustrate the touch screen 52. Touch screen 52 includes a touch surface 60 bordered by a rectangular frame or bezel 62. Touch surface 60 is in the form of a rectangular planar sheet of passive material but may in fact be any suitable surface. Optical recording devices in the form of DSP-based CMOS digital cameras $63_0$ to $63_3$ are positioned adjacent each corner of the touch screen 52. Each digital camera $63_N$ is mounted on a frame assembly 64. Each frame assembly 64 includes an angled support plate 66 on which the digital camera $63_N$ is mounted. Supporting frame elements 70 and 72 are mounted on the plate 66 by way of posts 74 and secure the plate 66 to the frame 62.

Each digital camera $63_N$ includes a two-dimensional CMOS image sensor 80 having an associated lens assembly, a first-in-first-out (FIFO) buffer 82 coupled to the image sensor 80 by a data bus and a digital signal processor (DSP) 84 coupled to the FIFO 82 by a data bus and to the image sensor 80 by a control bus. A boot EPROM 86 and a power supply subsystem 88 are also included.

In the present embodiment, the CMOS camera image sensor 80 is a National LM9617 image sensor configured for a 640×20 pixel subarray that can be operated to capture image frames at rates in excess of 200 frames per second. Arbitrary pixel rows of the image sensor 80 can be selected. Since the pixel rows can be arbitrarily selected, the pixel subarray can be exposed for a greater duration for a given digital camera frame rate providing for good operation in darker rooms in addition to well lit rooms. The FIFO buffer 82 is manufactured by Cypress under part number CY7C4211 V and the DSP 84 is manufactured by Analog Devices under part number ADSP2185M.

The DSP 84 receives and processes image frames from the image sensor 80 to determine the edges of a pointer within the image frames. In addition, the DSP 84 provides control information to the image sensor 80 via the control bus. The control information allows the DSP 84 to control perimeters of the image sensor 80 such as exposure, gain, array configuration, reset and initialization. The DSP 84 also provides clock signals to the image sensor 80 to control the frame rate of the image sensor 80.

Figure 6:
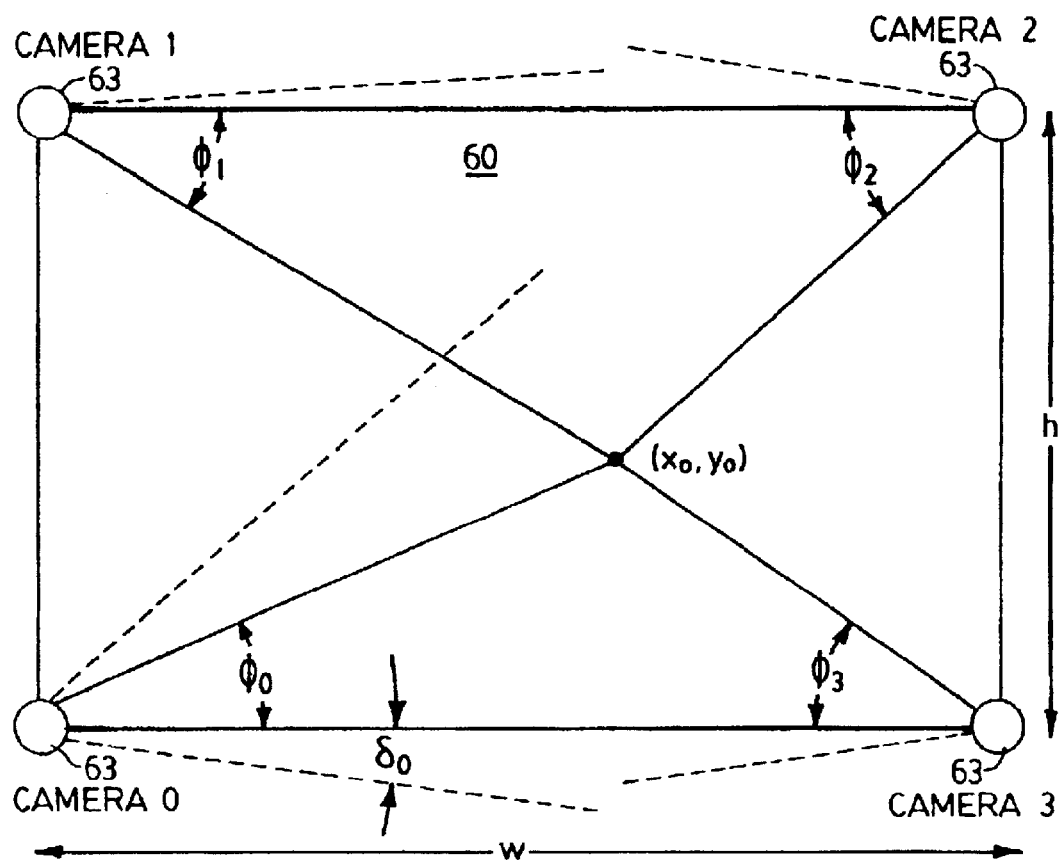
FIG. 6 shows triangulation geometry used to calculate a pointer contact position on the touch surface of the touch screen.

The angle of the plate 66 and the optics of the digital cameras $63_N$ are selected so that the field of view (FOV) of each digital camera $63_N$ is slightly beyond 90°. In this way, the entire touch surface 60 is within the field of view of each digital camera $63_N$ with the field of view of each digital camera $63_N$ extending slightly beyond a designated peripheral edge of the touch surface 60 as shown in FIG. 6.

Figure 5:
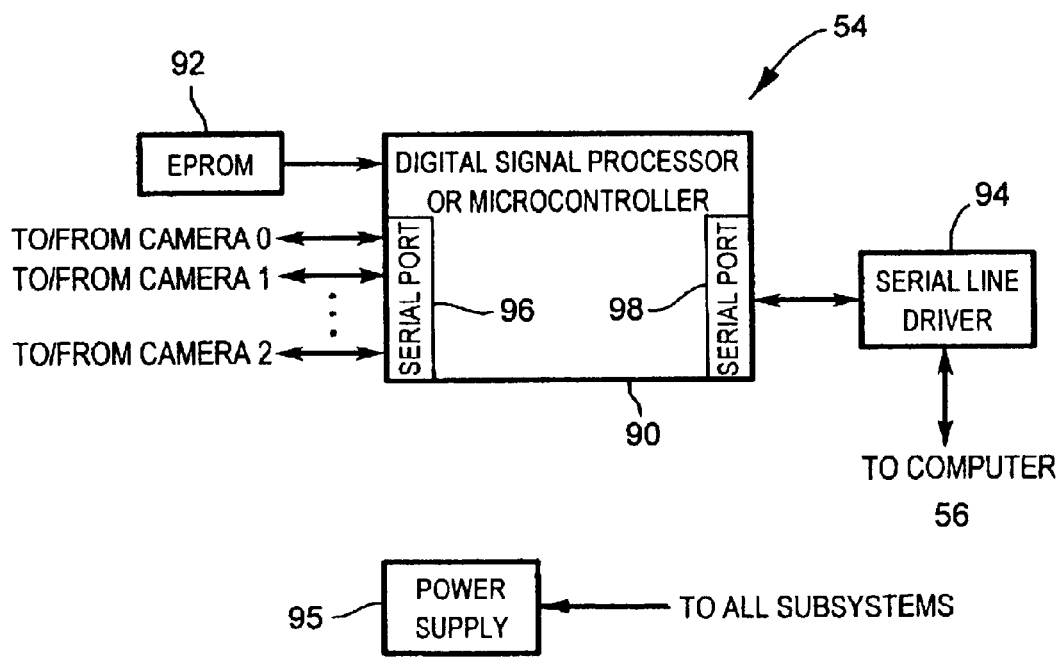
FIG. 5 is a schematic diagram of a master controller forming part of the touch system of FIG. 1.

Master controller 54 is best illustrated in FIG. 5 and includes a DSP 90, a boot EPROM 92, a serial line driver 94 and a power supply subsystem 95. The DSP 90 communicates with the DSPs 84 of the digital cameras $63_0$ to $63_3$ over a data bus via a serial port 96 and communicates with the computer 56 over a data bus via a serial port 98 and the serial line driver 94. In this embodiment, the DSP 90 is manufactured by Analog Devices under part number ADSP2185M. The serial line driver 94 is manufactured by Analog Devices under part number ADM222.

The master controller 54 and each digital camera $63_N$ follow a communication protocol that enables bi-directional communications via a common serial cable similar to a universal serial bus (USB). The transmission bandwidth is divided into thirty-two (32) 16-bit channels. Of the thirty-two channels, six (6) channels are assigned to each of the DSPs 84 in the digital cameras $63_0$ to $63_3$ and to the DSP 90 in the master controller 54 and the remaining two (2) channels are unused. The master controller 54 monitors the twenty-four (24) channels assigned to the DSPs 84. The DSPs 84 monitor the six (6) channels assigned to the DSP 90 of the master controller 54. Communications between the master controller 54 and the digital cameras $63_0$ to $63_3$ are performed as background processes in response to interrupts.

The operation of the touch system 50 will now be described. Initially, a camera offset angle calibration routine is performed to determine the offset angle δ of each digital camera $63_N$ (see FIG. 6). Details of the camera offset angle calibration are described in Applicants' co-pending U.S. application Ser. No. 09/870,698 entitled "Calibrating Camera Offsets to Facilitate Object Position Determination Using Triangulation" filed on Jun. 1, 2001, the contents of which are incorporated herein by reference.

With the touch system 50 calibrated, each digital camera $63_N$ acquires image frames of the touch surface 60 within the field of view of its image sensor 80 at a desired frame rate and loads the pixel data associated with the selected pixel subarray into the FIFO buffer 82. The DSP 84 in turn reads the pixel data from the FIFO buffer 82 and processes the pixel data to determine if a pointer exists in the image frame.

If a pointer is in the acquired image frame, the pixel data is further processed by the DSP 84 to determine the edges of the pointer visible to the digital camera $63_N$ in each pixel row of the subarray. In the present embodiment, a combination of image contrast with a differentiating edge detector is used. Specifics concerning edge detection can be found in "The Image Processing Handbook", Fourth Edition by John C. Russ, CRC Press, Publication Date: Jul. 26, 2002, Chapter 4: Image Enhancement and in "Algorithms for Image Processing and Computer Vision" by J. R. Parker, Wiley Computer Publishing, Publication Date: 1997, Chapter 1: Advanced Edge Detection Techniques. The z-position of the pointer is also determined so that a determination can be made as to whether the pointer is contacting or hovering above the touch surface 60. Pointer information packets (PIPs), including the pointer edge and contact or hover data, status and/or diagnostic information, are then generated by the DSP 84 and the PIPs are queued for transmission to the master controller 54. The digital cameras $63_0$ to $63_3$ also receive and respond to command PIPs generated by the master controller 54.

The master controller 54 polls the digital cameras $63_0$ to $63_3$ for PIPs in the queues. In this particular embodiment, the master controller 54 polls the digital cameras at a rate exceeding the image sensor frame rates. Upon receipt of PIPs from the digital cameras $63_N$, the master controller 54 examines the PIPs to determine if the PIPs include pointer edge data. If the PIPs include pointer edge data, the master controller 54 triangulates the pointer edge data in the PIPs to determine bounding areas in which the pointer is located.

During triangulation, triangulation is performed in respect of each pair of cameras capturing images of the pointer with the exception of the diagonal digital camera pairs and for each pixel row to yield a plurality of bounding areas. The minimum bounding area, which may range from a four-sided polygon to an eight-sided polygon, for each pixel row is then selected to reduce the effects of erroneous or sub-optimal measurements. Once the minimum bounding area for each pixel row has been selected, a model, in the present embodiment a rectangular box whose size is a function of the size of the minimum bounding area, is superimposed on the bounding area and defines the pointer perimeter and hence pointer size at that pixel row. The size of the box describes the pointer size in terms of pixels by height and width.

In order to determine the center of the pointer at a selected pixel row, the parameters of the model such as its center, superimposed on each bounding area is determined and the centers are averaged to determine the pointer center in sub-pixel accuracy.

The size and orientation of the model superimposed on the smallest bounding area for each pixel row is used by the master controller 54 to determine the size and orientation of the pointer. Knowing the size of pointer helps to reduce pointer ambiguity. If there is prior knowledge concerning the pointer size, then the acquired bounding areas can be used to identify quickly potential pointers from other objects captured in the camera images. Objects that are too large or too small as compared to the historical pointer size can be discarded as erroneous.

Knowing the orientation of the pointer can be important depending on the shape of the pointer. If the bounding area is circular, the pointer is a cylindrical and pointer orientation is not important. However, if the bounding area is rectangular in shape then pointer orientation becomes important. For example in the case of a pointer in the form of a standard rectangular chalk board eraser, if the longest side of the rectangular eraser runs up and down, then it can be determined that the eraser is held in a vertical orientation. Likewise if the longest side of the rectangular eraser runs left to right, then it can be determined that the eraser is held in a horizontal orientation. Being able to determine pointer orientation is particularly beneficial when performing an erasing function since erasing can be limited to the pointer perimeter contacting the touch surface regardless of the pointer size. This is substantially different from single point contact touch systems that erase a predefined area surrounding a touch surface contact irrespective of pointer size and orientation.

The master controller 54 also calculates a volumetric representation of the pointer by examining the model superimposed on the minimum bounding area associated with each pixel row of the subarray. Changes in size of the model enable the configuration of the pointer to be determined. For example, in the case of a conical pointer, the pixel row capturing pixel data associated with the tip of the pointer, yields a small bounding area and an equally small model. Pixel rows capturing pixel data associated with the pointer body away from the pointer tip, yield larger bounding areas as the pointer broadens and therefore equally larger models. This change in model size allows the master controller 54 to determine the conical configuration of the pointer.

In the case of a pointer such as a finger that has a generally cylindrical shape, especially when the finger is pressed and flattened against the touch surface, the pixel rows capturing pixel data along the length of the finger, yield bounding areas and corresponding models that are basically the same size. This allows the master, controller 54 to determine the cylindrical configuration of the pointer. As will be appreciated, by stacking the bounding areas or models generated for a series of pixel rows, a three-dimensional volumetric representation of the pointer can be constructed allowing the pointer type to be determined.

Once the master controller 54 has determined the pointer perimeter and the pointer orientation, the master controller 54 transmits the calculated pointer perimeter and orientation data, status and/or diagnostic information to the computer 56. In this manner, the pointer perimeter and orientation data transmitted to the computer 56 can be recorded as writing, drawing or erasing or can be used to control execution of application programs executed by the computer 56. The computer 56 also updates the display output conveyed to the projector 58 so that information presented on the touch surface 60 reflects the pointer activity. The master controller 54 also receives commands from the computer 56 and responds accordingly as well as generates and conveys command PIPs to the digital cameras $63_N$.

Figure 7:
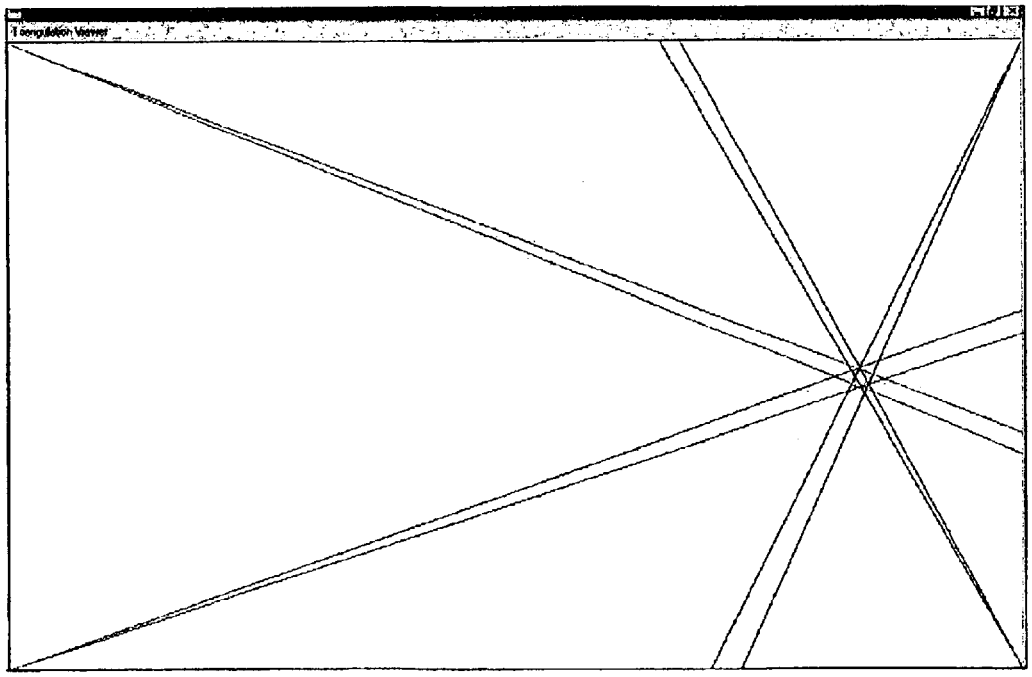
FIGS. 7 to 9 are graphical representations of overlapping triangulated pointer edges defining bounding areas generated in response to contacts on the touch surface using different type pointers, models in the form of shaded rectangular boxes being superimposed on the bounding areas.
Figure 8:
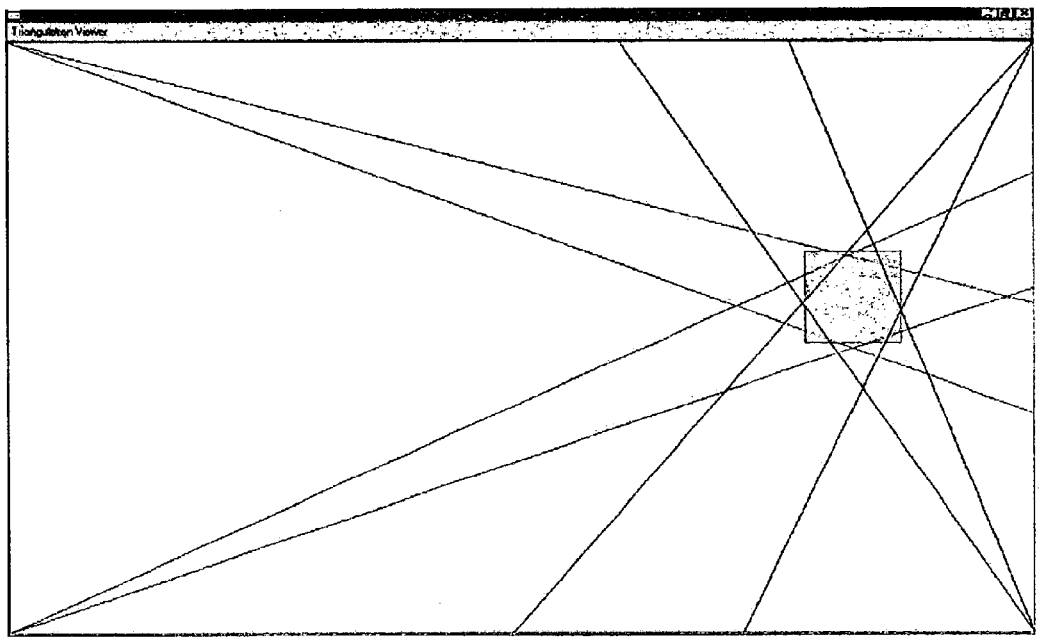
Figure 9:
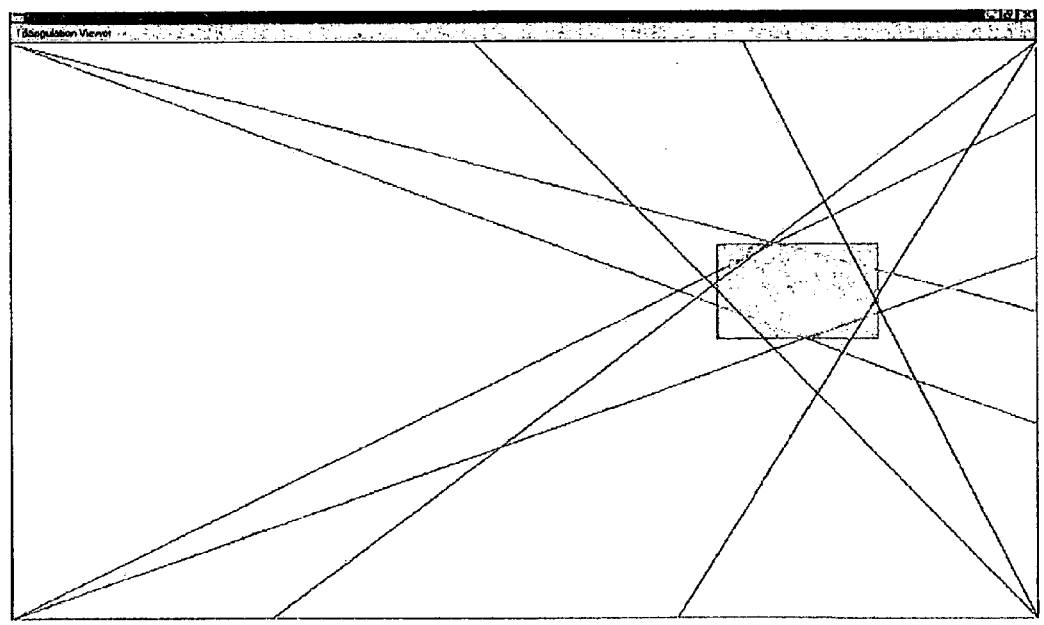

Turning now to FIGS. 7 to 9, graphical representations of overlapping triangulated edges defining bounding areas are shown. As can be seen, the bounding areas are not box-shaped but actually take the form of multi-sided polygons with the number of sides of the polygons ranging from four when using PIPs generated by a pair of cameras to eight when using PIPs generated by four cameras. In FIG. 7, the bounding area is generated as a result of a finger contacting the touch surface. In FIG. 8, the bounding area is generated as a result of a hockey puck contacting the touch surface. In FIG. 9, the bounding area is generated as a result of a rectangular eraser contacting the touch surface with the longest side of the eraser being in the horizontal orientation. As will be appreciated, this Figure clearly shows how pointer orientation can be used and in this case defines an erase tool perimeter of the correct size and orientation.

Figure 10:
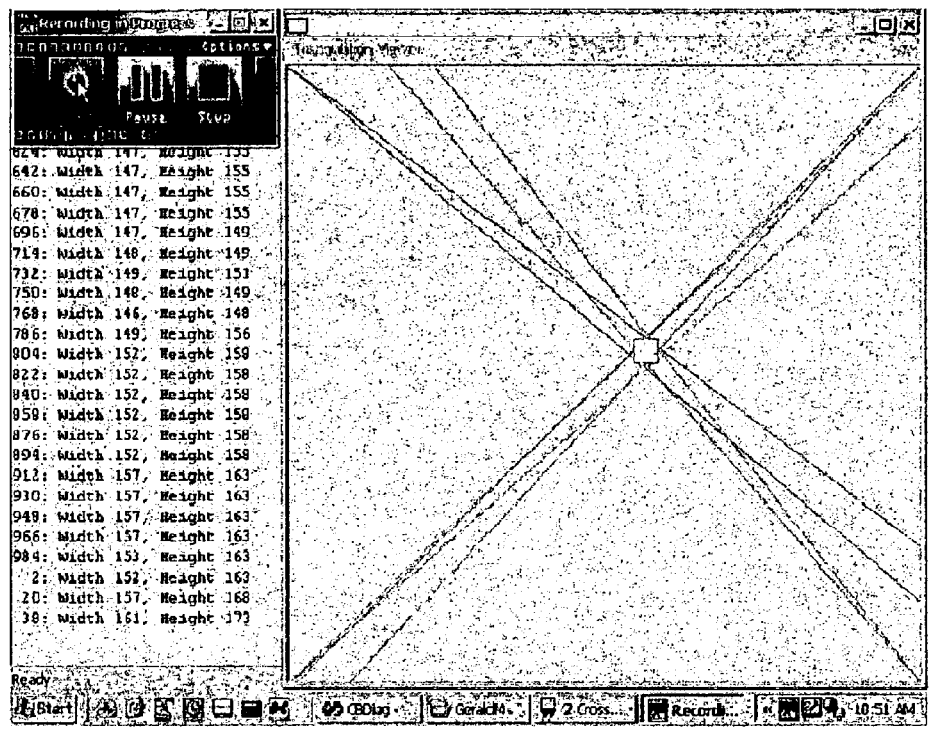
FIGS. 10 and 11 are screen shots generated by a diagnostic program showing the size, orientation and relative scale of different pointers contacting the touch surface.
Figure 11:
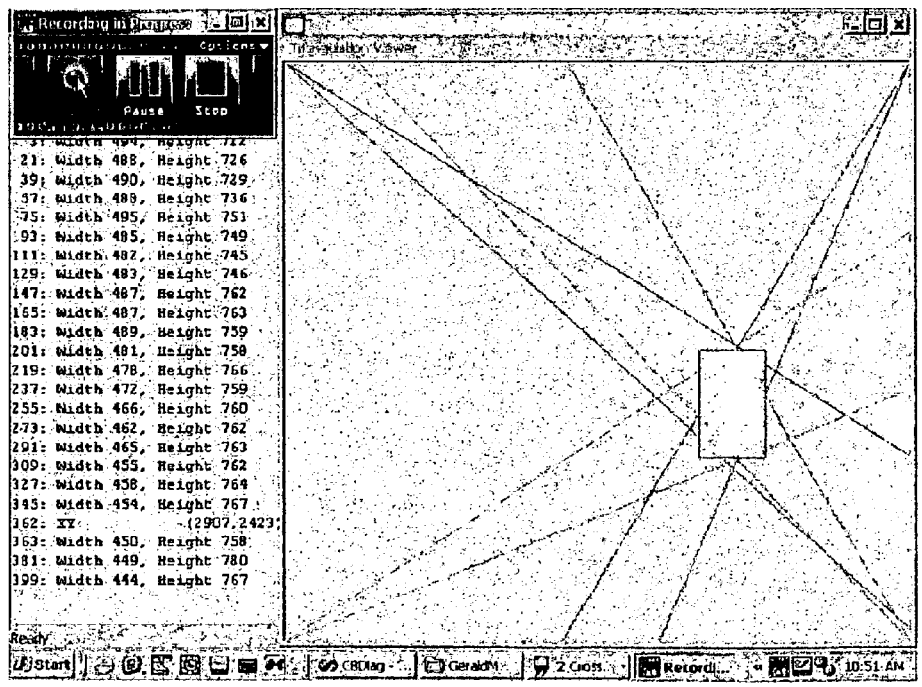

FIGS. 10 and 11 are screen shots generated by a diagnostic program showing the size, orientation and relative scale of different pointers contacting the touch surface. In particularly, FIG. 10 shows a small pointer of uniform width and height contacting the touch surface. The size of the pointer is 161×173 pixels. FIG. 11 shows a different pointer in contact with the touch surface. The size of the pointer in this case is 444×767 pixels.

Although a box-shaped rectangular model is shown superimposed over the bounding areas, those of skill in the art will appreciate that other model shapes may be used. Alternatively, the shapes of the bounding areas may be used to define the pointer perimeters. The center of the pointer can likewise be calculated by averaging the centers of the bounding areas. Also, although the master controller is shown as a separate processor, one of the camera processors may perform the master controller function and receive PIPs from the other camera processors.

As previously described in order to generate a three-dimensional volumetric representation of the pointer, the bounding area or model associated with each pixel row of the subarray is placed in a stack and the sizes of the bounding areas or models are compared. Of course only selected bounding areas or models need be examined. Also, if only pointer contact with the touch surface is of concern, triangulation need only be performed for the pixel row looking directly along the touch surface. In this manner, only the pointer perimeter at the touch surface contact point is defined.

Although preferred embodiments of the present invention have been described, those of skill in the art will appreciate that variations and modifications may be made without departing from the spirit and scope thereof as defined by the appended claims.

What is claimed is:

1. A touch system comprising:
   at least two optical recording devices associated with a touch surface, said at least two optical recording devices acquiring images of said touch surface from different locations and having overlapping fields of view; and
   processing circuitry processing image data acquired by said at least two optical recording devices to detect edges of a pointer in said images and to triangulate the detected edges to determine a bounding area that defines a pointer perimeter.

2. A touch system according to claim 1 wherein said processing circuitry further determines the center of the bounding area thereby to determine the center of said pointer.

3. A touch system according to claim 2 wherein said processing circuitry examines the shape of the bounding area to determine the orientation of said pointer relative to said touch surface.

4. A touch system according to claim 3 wherein said touch surface is generally rectangular and wherein an optical recording device is positioned adjacent each corner of said touch surface, said processing circuitry triangulating detected edges in images captured by multiple pairs of optical recording devices to yield multiple bounding areas, the smallest of said bounding areas being selected as the bounding area defining said pointer perimeter.

5. A touch system according to claim 4 wherein said processing circuitry averages the centers of said multiple bounding areas to determine the center of said pointer.

6. A touch system according to claim 5 wherein said optical recording devices are digital cameras.

7. A touch system according to claim 6 wherein said digital cameras are CMOS digital cameras having selectable pixel arrays, pixel data from subsets of said pixel arrays being processed by said processing circuitry.

8. A touch system according to claim 7 wherein said processing circuitry includes a camera processor associated with each digital camera, each camera processor processing pixel data to detect edges of said pointer.

9. A touch system according to claim 8 wherein said processing circuitry further includes a master processor triangulating the detected edges to determine said multiple bounding areas and to select said smallest bounding area.

10. A touch system according to claim 1 wherein said processing circuitry superimposes a model over said bounding area, said model having a size proportional to said bounding area and defining said pointer perimeter.

11. A touch system according to claim 10 wherein said processing circuitry determines the center of said model thereby to determine the center of said pointer.

12. A touch system according to claim 11 wherein said model is generally rectangular and is centred over said bounding area.

13. A touch system according to claim 1 wherein said optical recording devices are digital cameras having selectable pixel arrays, pixel data at least from pixel rows capturing the region of said pointer in contact with said touch surface being processed to determine said bounding area.

14. A touch system according to claim 13 wherein said processing circuitry examines the shape of said bounding area to determine the orientation of said pointer relative to said touch surface.

15. A touch system according to claim 14 wherein pixel data from pixel rows capturing regions of said pointer along its length are processed to determine a series of bounding areas, said series of bounding areas being stacked to generate a volumetric representation of said pointer.

16. A touch system comprising:
at least two digital cameras associated with a touch surface, said at least two digital cameras acquiring images of said touch surface from different locations and having overlapping fields of view; and
processing circuitry processing pixel data acquired by said at least two digital cameras to detect edges of a pointer in said images and to triangulate the detected edges to determine at least one bounding area that represents a pointer perimeter.

17. A touch system according to claim 16 wherein said processing circuitry further determines the center of the bounding area thereby to determine the center of said pointer.

18. A touch system according to claim 17 wherein said processing circuitry examines the shape of the bounding area to determine the orientation of said pointer relative to said touch surface.

19. A touch system according to claim 18 wherein said at least two digital cameras are CMOS digital cameras having selectable pixel arrays, said processing circuitry processing pixel data from subsets of said pixel arrays.

20. A touch system according to claim 19 wherein said processing circuitry includes a camera processor associated with each digital camera, each camera processor processing pixel data to detect edges of said pointer.

21. A touch system according to claim 20 wherein said processing circuitry further includes a master processor triangulating the detected edges to determine said bounding area.

22. A touch system according to claim 16 wherein said touch surface is generally rectangular and wherein a digital camera is positioned adjacent each corner of the touch surface, said processing circuitry triangulating detected edges in images captured by multiple pairs of digital cameras to yield multiple bounding areas, the smallest bounding area being selected to represent said pointer perimeter.

23. A touch system according to claim 22 wherein said processing circuitry averages the centers of said multiple bounding areas to determine the center of said pointer.

24. A touch system according to claim 22 wherein said processing circuitry superimposes a model over each of said bounding areas, the model superimposed on the smallest bounding area defining said pointer perimeter.

25. A touch system according to claim 24 wherein said processing circuitry averages the centers of said models thereby to determine the center of said pointer.

26. A touch system according to claim 16 wherein said digital cameras have selectable pixel arrays, pixel data at least from pixel rows capturing the region of said pointer in contact with said touch surface being processed to determine said bounding area.

27. A touch system according to claim 26 wherein said processing circuitry examines the shape of said bounding area to determine the orientation of said pointer relative to said touch surface.

28. A touch system according to claim 27 wherein pixel data from pixel rows capturing regions of said pointer along its length are processed to determine a series of bounding areas, said series of bounding areas being stacked to generate a volumetric representation of said pointer.

29. A touch system comprising:
a touch surface;
at least two cameras associated with said touch surface, said at least two cameras acquiring images of said touch surface from different locations and having overlapping fields of view;
a digital signal processor associated with each camera, the digital signal processors associated with said at least two cameras processing pixel data acquired by selected pixel subsets of the at least two digital cameras to generate pointer characteristic data when a pointer exists in said acquired images, said pointer characteristic data identifying edges of said pointer; and
a master digital signal processor triangulating the edge information in said pointer characteristic data to determine a bounding area defining a pointer perimeter.

30. A touch system according to claim 29 wherein said processing circuitry further determines the center of the bounding area thereby to determine the center of said pointer.

31. A touch system according to claim 30 wherein said processing circuitry examines the shape of the bounding area to determine the orientation of said pointer relative to said touch surface.

32. A touch system according to claim 31 wherein said at least two cameras are CMOS digital cameras having selectable pixel arrays, said processing circuitry processing pixel data from subsets of said pixel arrays.

33. A touch system according to claim 32 wherein said processing circuitry includes a camera processor associated with each digital camera, each camera processor processing pixel data to detect the edges of said pointer.

34. A touch system according to claim 33 wherein said processing circuitry further includes a master processor triangulating the detected edges to determine said bounding area.

35. A touch system according to claim 34 wherein said touch surface is generally rectangular and wherein a digital camera is positioned adjacent each corner of the touch surface, said processing circuitry triangulating detected edges in images captured by multiple pairs of digital cameras to yield multiple bounding areas, the smallest bounding area being selected to represent said pointer perimeter.

36. A touch system according to claim 35 wherein said processing circuitry averages the centers of said multiple bounding areas to determine the center of said pointer.

37. A touch system according to claim 35 wherein said processing circuitry superimposes a model over each of said bounding areas, the model superimposed on the smallest bounding areas defining said pointer perimeter.

38. A touch system according to claim 37 wherein said processing circuitry averages the centers of said models thereby to determine the center of said pointer.

39. A method of detecting the perimeter of a pointer relative to a touch surface comprising the steps of:
acquiring multiple images of a pointer relative to said touch surface;
processing pixel data resulting from said images to detect edges of said pointer; and
triangulating the detected edges to determine a bounding area representing said perimeter.

40. The method of claim 39 further comprising the step of determining the center of the bounding area thereby to determine the center of the pointer.

41. The method of claim 40 further comprising examining the shape of the bounding area to determine the orientation of the pointer relative to the touch surface.

42. The method claim 39 wherein during said processing pixel data associated with the region of said pointer in contact with said touch surface is processed and triangulated.

43. The method of claim 42 further comprising determining the center of the bounding area thereby to determine the center of the pointer.

44. The method of claim 43 further comprising examining the shape of the bounding area to determine the orientation of the pointer relative to the touch surface.

45. The method of claim 44 wherein pixel data associated with regions of said pointer along its length are processed and triangulated to yield as series of bounding areas, said series of bounding areas being stacked to generate a volumetric representation of said pointer.

46. A method of erasing electronic ink presented on a touch surface in response to movement of a pointer over said touch surface comprising the steps of:

tracking movement of said pointer over said touch surface;

determining the perimeter of the pointer that is in contact with said touch surface; and erasing electronic ink contacted by said determined perimeter.

47. The method of claim 46 wherein said perimeter is represented by a model having a size proportional to said perimeter.

48. The method of claim 46 further comprising the steps of examining the shape of said perimeter to determine the orientation of said pointer relative to said touch surface.

49. A touch system comprising:

at least two imaging devices associated with a touch surface, said at least two imaging devices acquiring images of said touch surface from different locations and having overlapping fields of view; and processing structure processing image data acquired by said at least two imaging devices to detect a pointer in said images and to determine a bounding area encompassing a tip of said pointer using triangulation.

50. A touch system according to claim 49 wherein said processing structure further determines the center of the bounding area thereby to determine the center of said pointer.

51. A touch system according to claim 50 wherein said processing structure examines the shape of the bounding area to determine the orientation of said pointer relative to said touch surface.

52. A touch system according to claim 51 wherein said touch surface is generally rectangular and wherein an imaging device is positioned adjacent each corner of said touch surface, said processing structure triangulating pointer data in images captured by multiple pairs of imaging devices to yield multiple bounding areas, the smallest of said bounding areas being selected as the bounding area encompassing said pointer tip.

53. A touch system according to claim 52 wherein said processing structure averages the centers of said multiple bounding areas to determine the center of said pointer.

54. A touch system according to claim 49 wherein said processing structure superimposes a model over said bounding area, said model having a size proportional to said bounding area and defining said pointer tip.

55. A touch system according to claim 54 wherein said processing structure determines the center of said model thereby to determine the center of said pointer.

56. A touch system according to claim 55 wherein said model is generally rectangular and is centred over said bounding area.

57. A touch system comprising:

at least two digital cameras associated with a touch surface, said at least two digital cameras acquiring images of said touch surface from different locations and having overlapping fields of view; and processing structure processing pixel data acquired by said at least two digital cameras to detect a pointer in said images and to determine at least one bounding area that encompasses a tip of said pointer using triangulation.

58. A touch system according to claim 57 wherein said processing structure further determines the center of the bounding area thereby to determine the center of said pointer.

59. A touch system according to claim 58 wherein said processing structure examines the shape of the bounding area to determine the orientation of said pointer relative to said touch surface.

60. A touch system according to claim 59 wherein said at least two digital cameras comprise CMOS digital cameras having selectable pixel arrays, said processing circuitry processing pixel data from subsets of said pixel arrays.

61. A touch system according to claim 57 wherein said touch surface is generally rectangular and wherein a digital camera is positioned adjacent each corner of the touch surface, said processing structure triangulating pointer data in images captured by multiple pairs of digital cameras to yield multiple bounding areas, the smallest bounding area being selected as the bounding area encompassing said pointer tip.

62. A touch system according to claim 61 wherein said processing structure averages the centers of said multiple bounding areas to determine the center of said pointer.

63. A touch system according to claim 57 wherein said processing structure superimposes a model over said bounding area, said model having a size proportional to said bounding area and defining said pointer tip.

64. A touch system according to claim 63 wherein said processing structure determines the center of said model thereby to determine the center of said pointer.

65. A touch system according to claim 64 wherein said model is generally rectangular and is centred over said bounding area.

66. A method of detecting a pointer relative to a touch surface comprising the steps of:

acquiring multiple images of a pointer relative to said touch surface;

processing pixel data resulting from said images to detect said pointer; and determining a bounding area encompassing a tip of said pointer using triangulation.

67. The method of claim 66 further comprising determining the center of the bounding area thereby to determine the center of the pointer.

68. The method of claim 66 further comprising examining the shape of the bounding area to determine the orientation of the pointer relative to the touch surface.

* * * * *